(12) United States Patent  (10) Patent No.: US 7,473,043 B2
Tsuruta  (45) Date of Patent: Jan. 6, 2009

(54) CARD SUPPLYING MECHANISM AND CARD SUPPLYING METHOD

(75) Inventor: Wataru Tsuruta, Yamanashi (JP)

(73) Assignee: Nisca Corporation, Minamikoma-Gun, Yamanashi-Ken (JP)

( * ) Notice: Subject to any disclaimer, the term of this patent is extended or adjusted under 35 U.S.C. 154(b) by 505 days.

(21) Appl. No.: 11/230,224

(22) Filed: Sep. 19, 2005

(65) Prior Publication Data

US 2006/0065718 A1 Mar. 30, 2006

(30) Foreign Application Priority Data

Sep. 28, 2004 (JP) ............................. 2004-281959

(51) Int. Cl.
*B65H 1/24* (2006.01)
(52) U.S. Cl. .................. 400/624; 271/134; 271/166
(58) Field of Classification Search ............... 400/630, 400/624, 521; 271/121, 166, 110, 134; 347/104; 414/797.4–797.9, 801; *B65H 1/24, 1/30, B65H 5/06*
See application file for complete search history.

(56) References Cited

U.S. PATENT DOCUMENTS 4,728,096 A * 3/1988 Winkler et al. ............. 271/166
5,222,720 A * 6/1993 Newsome ................. 270/58.34
5,286,018 A * 2/1994 Rasmussen et al. .......... 271/147
6,575,454 B2 * 6/2003 Stevens ...................... 271/126

FOREIGN PATENT DOCUMENTS

| GB | 2038783 A | * | 7/1980 |
| JP | 02100928 A | * | 4/1990 |
| JP | 2001-151352 | | 6/2001 |
| JP | 2001-331853 | | 11/2001 |
| JP | 3330355 | | 7/2002 |

* cited by examiner

*Primary Examiner*—Leslie J Evanisko
(74) *Attorney, Agent, or Firm*—Manabu Kanesaka

(57) ABSTRACT

A card supplying mechanism includes a card stacker with a motor-driven rotatable eccentric cam for sequentially raising and lowering a moving member having an oblique, step-shaped card touching surface. A motor rotates the cam to a position of maximum diameter, thereby lifting vertically-stacked cards with the oblique, step-shaped card touching surface. The motor then drives further to rotate the cam to a position of minimum diameter, thereby separating one end of the cards on an oblique card support surface so as to mutually offset stacked cards. A kick roller then discharges from the stacker a bottommost stacked card. The card supplying mechanism provides a reliable supply of cards by virtue of both improved card separation, and reduced load on the bottommost card that is to be supplied.

16 Claims, 12 Drawing Sheets

CARD SUPPLYING MECHANISM AND CARD SUPPLYING METHOD

BACKGROUND OF THE INVENTION AND RELATED ART STATEMENT

The present invention relates to a card supplying mechanism and card supplying method for supplying cards to a main unit of a card issuing apparatus or a card printing apparatus. More particularly, the present invention relates to a card supplying mechanism and card supplying method adapted to the main unit for issuing and/or printing to many cards at one time.

Conventionally, to create card media, such as credit cards, cash cards, license cards, and ID cards, a thermal transfer type printing apparatus has been used for thermally transferring desired images and/or characters to cards via a thermal transfer film using a thermal transfer head. An example of a card printing apparatus that uses such a thermal transfer method is disclosed in Japanese Patent No. 3330355.

Recently, because of the increased need for issuing cards by printing large volumes of cards at a time, technologies have been developed for supplying to a card printing apparatus blank cards from a card supplying mechanism that holds high volumes of blank cards. Examples of these technologies are disclosed in Japanese Patent Publications (KOKAI) No. 2001-151352 and in No. 2001-331853.

Particularly, blank cards that are made of polyvinyl chloride (i.e., "PVC") have a variety of uses. However, such cards have a tendency to stick together when the apparatus is employed in an environment having high humidity. Such an environment often prevents cards from separating in a gravity based method.

Therefore, an object of the present invention is to provide a card supplying mechanism that provides improved separation of cards, and that securely supplies cards by reducing a load acting on a bottommost card that is to be supplied.

Another object of the present invention is to provide a card supplying method that provides improved separation of cards, and that securely supplies cards by reducing a load acting on the bottommost card to be supplied.

Further objects and advantages of the present invention will be apparent from the following description of the invention.

SUMMARY OF THE INVENTION

In order to attain the aforementioned objects of the present invention, a first aspect of the present invention is a card supplying mechanism. The mechanism has a card storage unit for storing cards stacked in a vertical orientation; support means for supporting cards at a predetermined height position of the card storage unit; control means fastened at a side opposite the support means of the card storage unit for controlling another side of cards; a moving member disposed as one body or as a separate body on the support means for lifting and moving one side of a quantity of the cards stored in the card storage unit; a drive unit for driving to raise and lower the moving member; and kicking means for sequentially kicking out a bottommost card of cards stored in the card storage unit.

According to the first aspect of the present invention, the moving member is disposed as a single body, or as a separate body, to the support means for moving one side of a quantity of the cards stored in the card storage unit. A drive unit raises and lowers the moving member. The rising and lowering action of the moving member causes cards to drop, thereby facilitating their separation. The support means for supporting one side of cards at a predetermined height position of the card storage unit, and the aligning means for aligning another other side of the cards, reduce the load acting on the bottommost card because the entire load of stacked cards stored in the card storage unit is not applied to the bottommost card. Therefore, the kicking means is able to securely kick out a bottommost card sequentially one at a time.

According to this first aspect of the present invention, a card touching surface of the moving member can be oblique and formed in steps, and a card supporting surface of the support means can also be oblique and formed in a straight line. The card storage unit has an inner wall that projects in a vertical direction. This inner wall can be formed so that a first stacked group and a second stacked group composed of cards separated in the vertical direction by support means and aligning means can be formed in an offset state.

In a preferred embodiment, the present invention includes a rotatable moving wall portion that is a part of the inner wall portion and disposed above an aligning means, and an elastic member for urging the moving wall portion toward the support means and the moving member. In the preferred embodiment, the card storage unit is configured as a cassette structure to facilitate its attachment to a main print unit.

It is contemplated that a variety of formats can be used for the mechanism associated with a drive unit for raising and lowering the moving member. For example, a first detection means disposed near a kicking means for detecting a card kicked by the kicking means, and a counter for counting the number of cards detected by the first detection means, can be provided. A drive unit raises and lowers a moving member each time the counter reaches a predetermined number. A first stacking portion is positioned below a second stacking portion. The first stacking portion has a second detecting means for detecting cards stacked in the first stacking portion. The drive unit raises and lowers the moving member when the second detecting means does not detect cards.

In another embodiment of the mechanism for raising and lowering the moving member, the invention can include a timer. The drive unit can then raise or lower the moving member each time the timer measures a predetermined amount of time.

To attain the aforementioned objects of the present invention, a second aspect of the present invention is a card supplying method. The method includes a raising process for aligning one side of cards for a quantity of cards stored in a stacked state, while raising the other side. After raising one side of cards, another process separates cards stored in a stacked state into two portions in a vertical direction. Of the two portions separated by the separating process, still another process supplies the lowermost cards sequentially and one at a time.

According to a second aspect of the card supplying method, in addition to a process for counting totals of cards kicked out in the kicking process, a raising process is performed for each predetermined count by the counter in the counting process. It is preferred that, in the raising process, cards are positioned in a mutually offset state.

These and other objects, aspects, and embodiments of the present invention will now be described in more detail with reference to the following drawings.

BRIEF DESCRIPTION OF THE DRAWINGS

FIG. 11A is a partially enlarged view of the state shown in FIG. 8; FIG. 11B is a partially enlarged view of the state shown in FIG. 9; and FIG. 11C is a partially enlarged view of the state shown in FIG. 10.

DETAILED DESCRIPTION OF THE PREFERRED EMBODIMENTS

The following is a detailed description of a first embodiment that applies the invention to a printing apparatus for printing characters and/or images to a card recording medium (hereinafter referred to simply as a "card"), with reference to the drawings provided.

Main Mechanism

Figure 1:
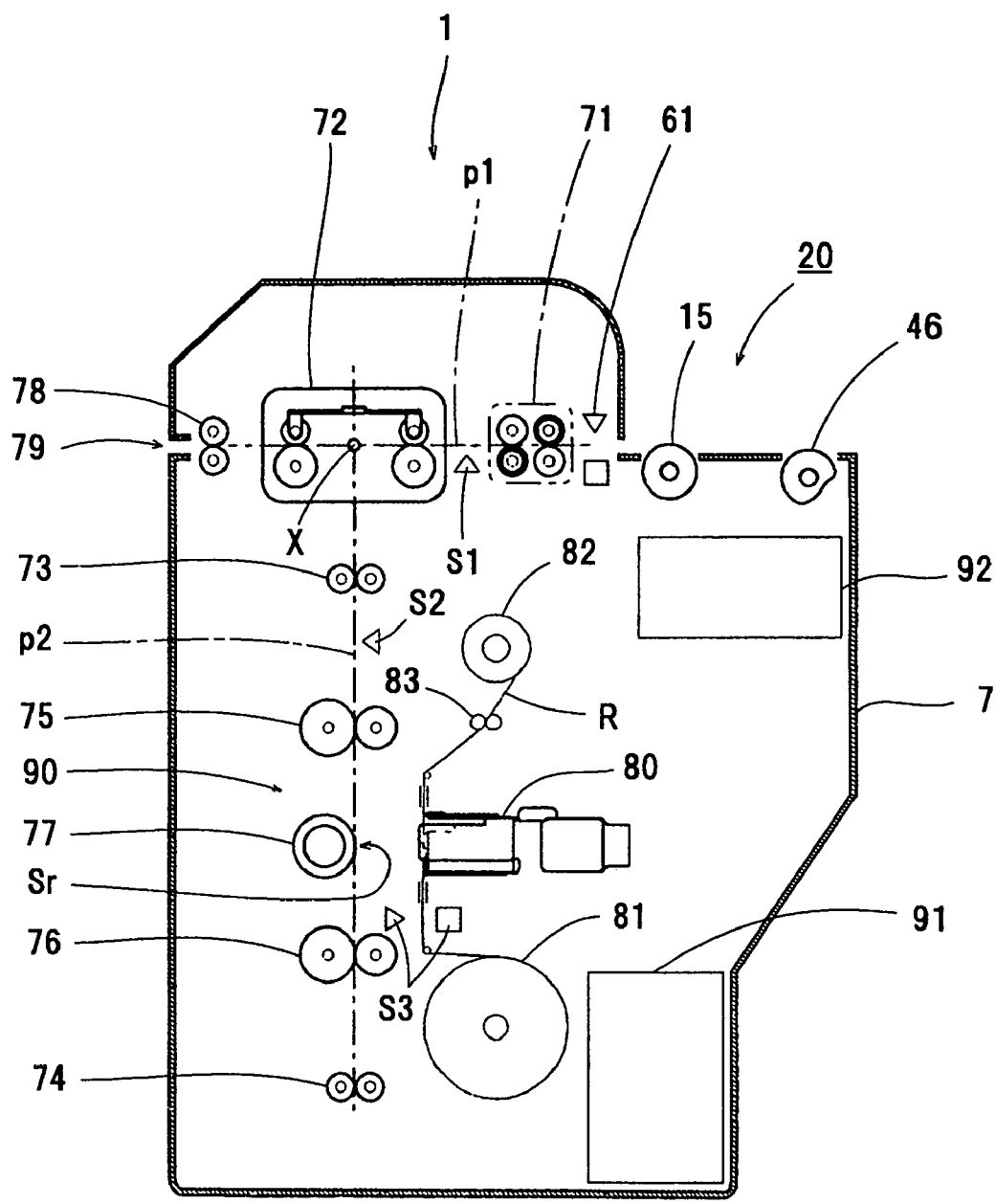
FIG. 1 is a conceptual sectional view of a printing apparatus to which the present invention can be applied.

As is shown in FIG. 1, a printing apparatus 1 of the first embodiment has a first transport path p1 disposed horizontally in a plastic casing 7 for transferring cards, and a second transport path p2 disposed substantially vertically at a right angle to the first transport path p1.

The first transport path p1 has a card supplying mechanism 10 (see FIG. 2) for kicking out one card at a time to the first transport path p1, as described below; a cleaner 71 disposed at a downstream side of the card supplying mechanism 10 for cleaning both surfaces of a card kicked out to the first transport path p1; a card turnover unit 72 that turns around an intersection point X of the first transport path p1 and the second card transport path p2; and a card discharge unit 79 disposed at a downstream side of the card turnover unit 72 for discharging a card handed over from the card turnover unit 72 to the outside (i.e., exterior) of the casing 7. The second transport path p2 has a card printing unit 90 for printing information to at least one surface of a card.

The cleaner 71, described above, has two pairs of rollers. There are cleaning rollers made of a rubber material having an adhesive nature, and pressing rollers that press against the cleaning rollers. The cleaning and pressing rollers nip the first transport path p1. Therefore, the cleaning rollers arranged both above and below the first transport path p1 rotate and pick up any foreign matter, such as dust, that may adhere to both surfaces of a card supplied toward the first transport path p1.

The card turnover unit 72 has two pinch rollers that form a pair to nip cards, and a turning frame for rotatably supporting the pinch rollers. The card turnover unit 72 turning frame rotates around an intersection point X of the first transport path p1 and the second transport path p2. The card turnover unit 72 serves to turn over the card transported on the first transport path p1 so as to place the card on the second transport path p2. The card turnover unit 72 also serves to supply the card, and to turn cards over 180°, so as to print to any one side or to both sides of cards at the card printing unit 90.

The pinch rollers of the card turnover unit 72 pressingly nip the first transport path p1 when the turning unit's rotating frame is horizontally oriented, and pressingly nip the second transport path p2 when the turning unit's rotating frame is vertically oriented. One of the pinch rollers is a drive roller. The other pinch roller is a follower roller. The rotations of the rotating frame and pinch rollers are executed by activating a drive system that drives the rotating frame and the pinch rollers in synchronization.

When turning the rotating frame while a card is nipped between the pinch rollers, that card will become displaced because the pinch rollers also rotate. Therefore, the system rotates the pinch rollers in a reverse direction at the same angle when rotating the rotating frame. Note that with this embodiment of the present invention, the system independently drives the rotating frame and the pinch rollers so as to prevent sympathetic rotation of the pinch rollers when rotating the frame.

The card discharge unit 79 has a pair of discharge rollers 78 for discharging cards that have undergone a predetermined printing process and have been handed over from the card turning unit 72 to the outside of the casing 7. The pair of discharge rollers 78 pressingly nip the first transport path p1. An opening is formed at a portion of the casing 7 on a line extending from the first transport path p1. This opening configures a part of the card discharge unit 79.

The card printing unit 90 employs a thermal transfer printer configuration. This unit comprises a platen roller 77 disposed at a printing position Sr on the second transport path p2; a thermal head 80 disposed to advance toward, or retreat from, the platen roller 77; and a pair of transport rollers 75 and 76 synchronized with a printing action of the thermal head 80 to move a card backwards and forwards (i.e., as depicted in FIG. 1, up and down in the vertical direction) on the second transport path p2 with respect to the printing position Sr.

A pair of guide rollers 73 is disposed between the card turnover unit 72 and the pair of transport rollers 75, and a pair of guide rollers 74 is disposed at a downstream side of the pair of transport rollers 76. These pairs of guide rollers guide the card so that the card is supplied substantially vertically along the second card path p2.

An ink ribbon R having an ink layer of Y (yellow), M (magenta), C (cyan), and Bk (black) arranged sequentially on its surface, interposes the platen roller 77 and the thermal head 80. When transferring information such as characters or images to a card transported along the second transport path p2, an ink supply reel 81 supplies the ink ribbon R. The ink ribbon is transported along by the rotation of a pair of take-up rollers 83, while substantially the entire surface of the ink ribbon touches the leading edge of the thermal head 80. During transport, the ink ribbon R is taken up by a take-up reel 82. At this time, by selectively activating heating elements on the thermal head 80 while pressing the thermal head 80 against the surface of the card with the ink ribbon R interposing the thermal head and the card surface, the thermal transfer ink components of the ink ribbon R are transferred to a surface of the card, thereby printing the predetermined characters and images. Guide rollers are also disposed along the transport path of the ink ribbon R.

A gear (not shown) mates with a drive side roller shaft of the pair of take-up rollers 83. The gear meshes with a gear that has a clock plate (not shown) on the same shaft. A unitized transmissive sensor (not shown) is disposed near the clock plate for detecting the rotation of the clock plate so as to control the amount of take-up of the ink ribbon R. A sensor S3 is disposed at an upstream side of the thermal head 80 (i.e., on the ribbon supply reel 81 side). The sensor S3 comprises a light emitting element and a light receiving element that are opposingly arranged to nip the ink ribbon R.

The advancing and retreating action of the thermal head 80 with respect to the platen roller 77 is accomplished by a holder that detachably holds the thermal head 80, a follower roller to which the holder is fastened, a non-circular cam that rotates while in contact with the outer circumference of the follower roller, and a head advancing and retreating drive unit (not shown), comprising a spring that pushes the holder into contact with the cam.

A unitized transmissive sensor S1 is disposed near the first transport path p1 between the cleaner 71 and the card turn over unit 72. A unitized transmissive sensor S2 is disposed near the second transport path p2 between the pair of guide rollers 73 and the pair of transport rollers 75 for detecting the leading and the trailing edges of the card in a transport direction.

The printer 1 has six motors. One is a direct drive motor 41 (see FIG. 4) that is capable of both forward and reverse drives that acts as the raising and lowering drive source for the card supplying mechanism 10 (described below). The other five motors are stepping motors that are also capable of both forward and reverse drive. The following describes the functions of the five stepping motors.

Motor A (not shown) drives the turning frame of the card turnover unit 72 and a kick roller 15 (described below). Motor B (not shown) drives the pressing rollers of the cleaner 71, the pinch rollers of the card turnover unit 72, and one of the pair of discharge rollers 78 (the driver roller). Motor M (not shown) drives the pair of transport rollers 75 and 76, and the platen roller 77. Motor Y (not shown) drives a spool shaft disposed in a central location of the pair of take-up rollers 83 and the ribbon take-up reel 82, and a spool shaft disposed in a central location of the ribbon supply reel 81. Motor Z (not shown) drives a cam that configures the head advancing and retreating drive unit. The dynamic forces of the motors A and B are transmitted to each drive roller described above via a drive transmission system (not shown) and a solenoid clutch.

The printer 1 comprises a control unit 92 for controlling the operation of the printer 1 including the card supplying mechanism (described below), and a power source 91 for converting commercial alternating electrical current into a direct electrical current that drives or operates each of the mechanisms and control unit of the invention.

The control unit 92 comprises a CPU block (microcomputer) for controlling the printer 1. The CPU block comprises a CPU that operates at a fast clock speed as the central processing unit, ROM that stores control operations for the printer 1, RAM that acts as a work area for the CPU, and an internal bus that connects the CPU, the ROM, and the RAM.

An external bus is connected to the CPU block. The external bus is also connected to a sensor control unit that controls signals from each sensor; an actuator control unit that controls a motor driver for outputting drive pulses to each motor and a solenoid clutch; a thermal head control unit that controls the thermal energy of the thermal head 80; an operation display control unit for controlling an operation panel 5 (see FIG. 3) that receives instructions from an operator and displays the status of the printer 1; an external I/O interface for communicating with an external computer, such as a personal computer; and an external RAM that stores image and character information to be printed to a card. The sensor control unit, actuator control unit, thermal head control unit, and the operation display control unit are each connected to sensors including sensors S1 to S3, and 48, 61 and 62 (described below), motor 41 and the five stepping motors, a solenoid clutch (not shown), the thermal head 80, and the operation panel 5.

Card Supplying Mechanism

As described above, the printer 1 has a card supplying mechanism 10 for sending, or "kicking out," cards one at a time to the first transport path p1. As is shown in FIGS. 2 to 8, the card supplying mechanism 10 is equipped with a card stacker 11 for stacking blank cards "C" in a vertical direction; a support member 12 (see FIG. 4) for supporting a trailing edge of the cards C stored in the card stacker 11 in a direction to supply the cards C to the printer 1 (i.e., initially to the cleaner 71) at a predetermined height position inside the card stacker 11; protruding aligning members 13 (see FIG. 6) fixed at a height position that is substantially the same as the support member 12 on a side opposing the inside of the card stacker 11 for controlling a leading edge in a direction for kicking out the card C to the printer 1; a moving member 14 (see FIG. 5) capable of raising and lowering movements, that touches the cards C supported by the support member 12 for raising one side of the supported cards C (the trailing edge side in the direction for kicking out cards) and the cards C stacked thereabove; a drive unit 40 (see FIG. 4) for raising and lowering the moving member 14 in the same up and down directions as the stacking direction of the cards C; a kick roller 15 (see FIG. 3) rotatably disposed on the printer 1 side for sequentially kicking out, one at a time, cards stacked in the card stacker 11; and a cover 16 that opens the inside of the card stacker by rotating around a rotating shaft Y (see FIG. 2) in the direction of arrow A in FIG. 2 so as to allow an operator to replenish cards C inside of the card stacker 11.

Figure 8:
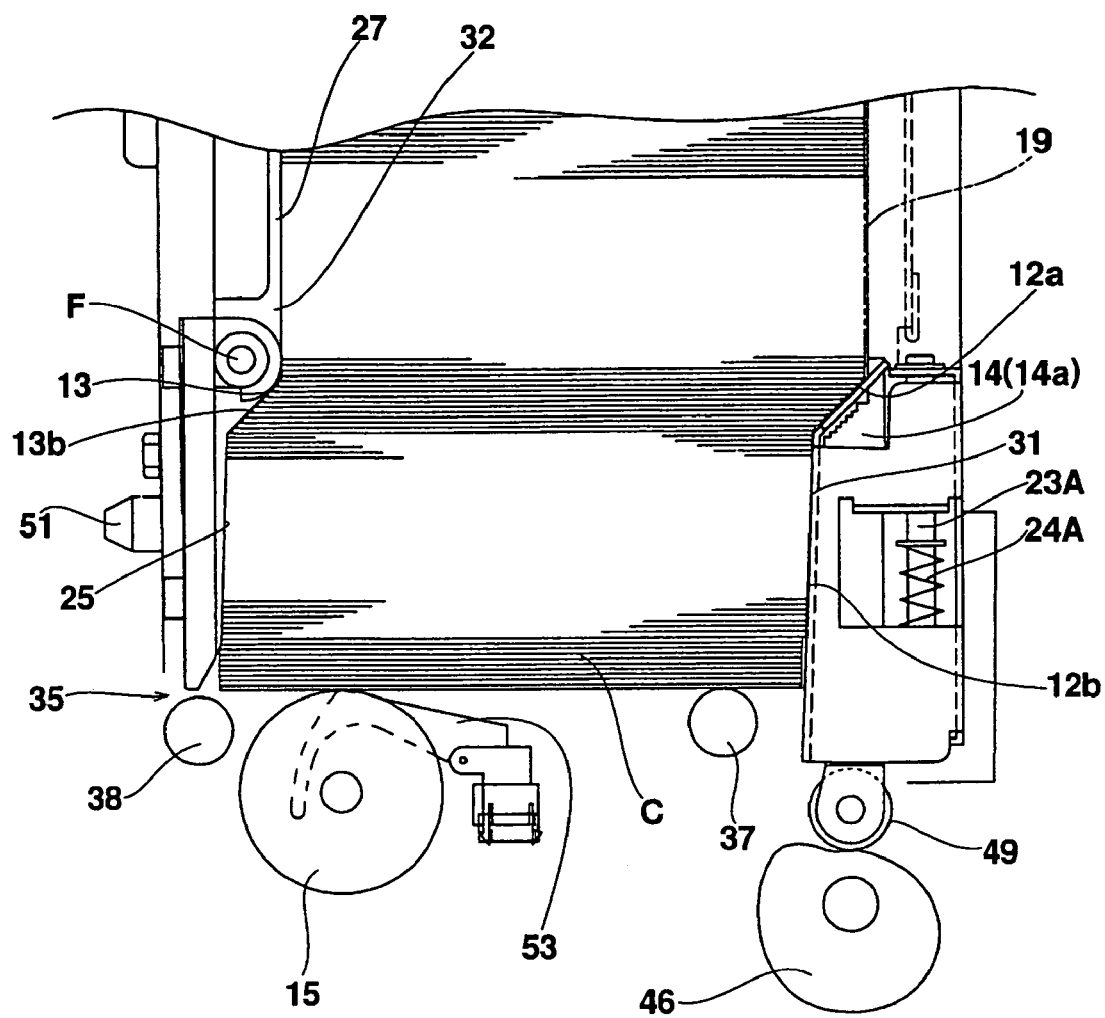
FIG. 8 is a front view showing an initial state when cards are stacked in the stacker.

As illustrated in FIG. 8, the card stacker 11 of this embodiment of the present invention is a high volume card stacker that can hold up to 250 of the cards C stacked in a vertical direction. The card stacker 11 has an opening slot 35 at a position facing the first transport path p1 that allows only one of the cards C to pass therethrough. The card C that is positioned at the bottom (i.e., the lowest level) of the cards stacked in the card stacker 11 touches the kick roller 15. Rotation of the kick roller 15 causes only the bottommost card to supply toward the first transport path p1 via the opening slot 35.

Figure 2:
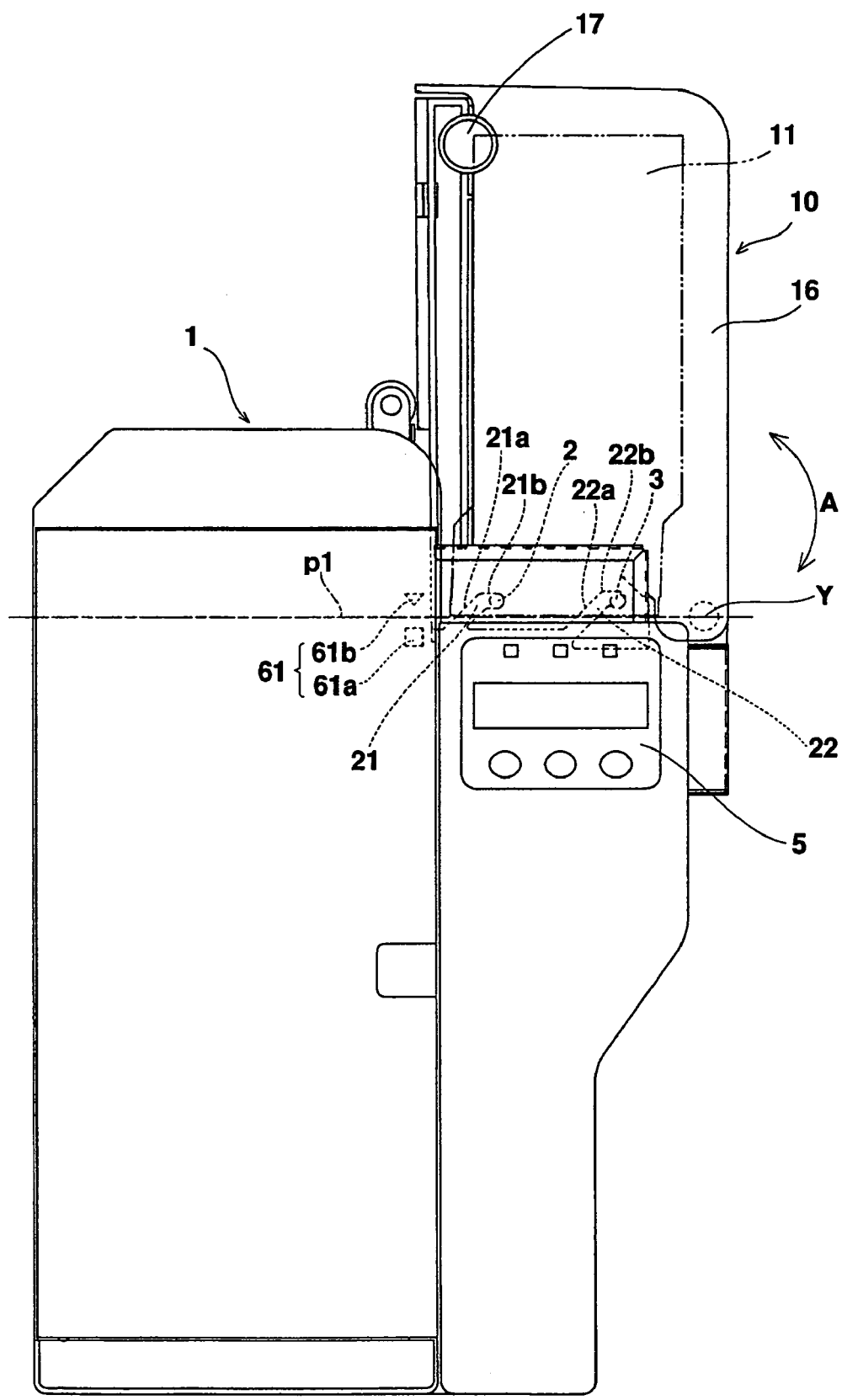
FIG. 2 is a front view showing a card stacker of a card supplying mechanism mounted to a printing apparatus according to an embodiment of the present invention.
Figure 6:
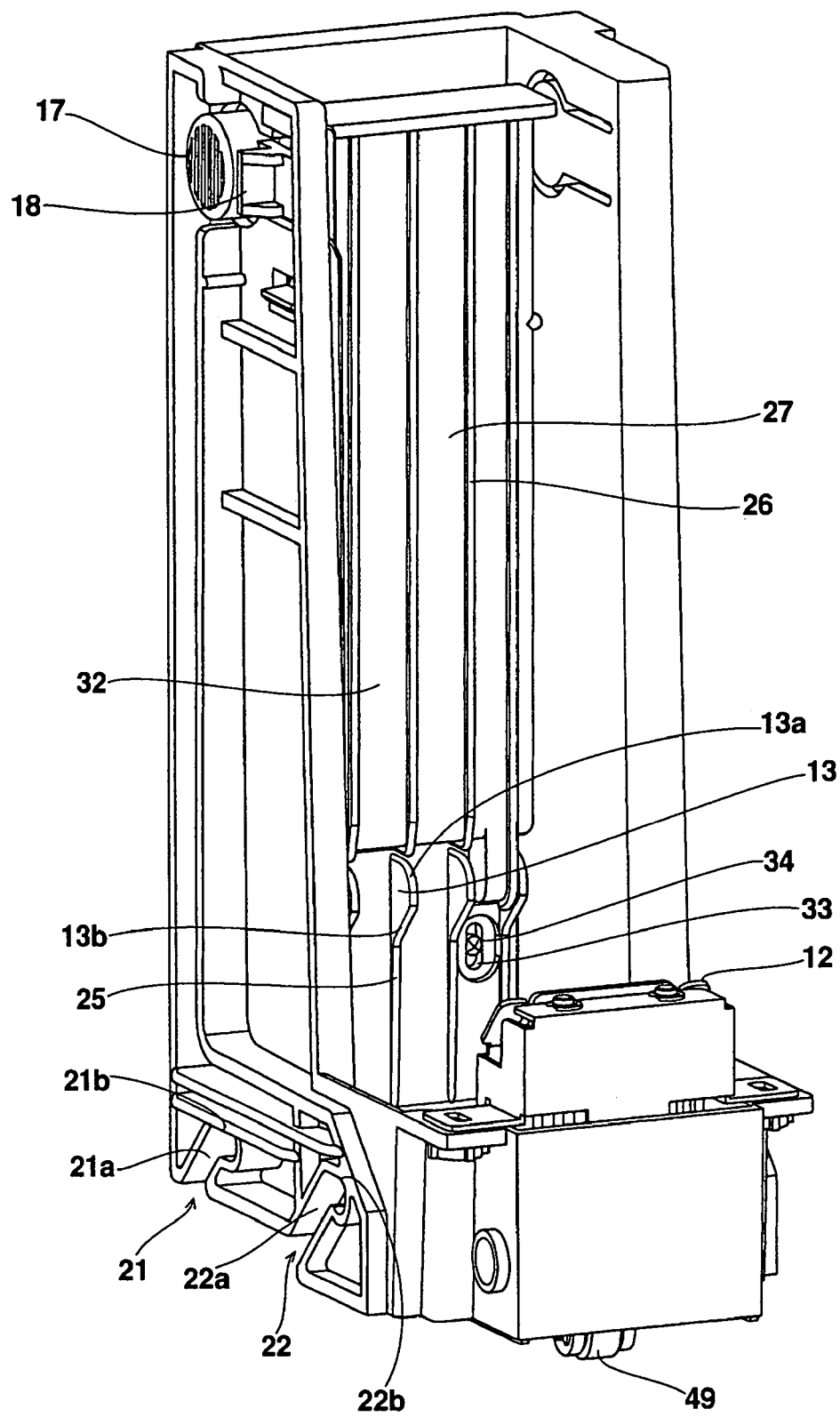
FIG. 6 is a perspective view showing a portion of an inner wall of the card stacker.

As shown in FIGS. 2 and 6, to rotate the cover 16 and open the inside of the card stacker 11, an operator presses inward an operating unit 17 disposed on a portion of the card stacker (there are two units 17: one on the front side and one on the backside). This causes the lock 18 to be released from its locked state with the groove (not shown) located on the inside of the cover 16. The cover 16 can then rotate freely.

Figure 4:
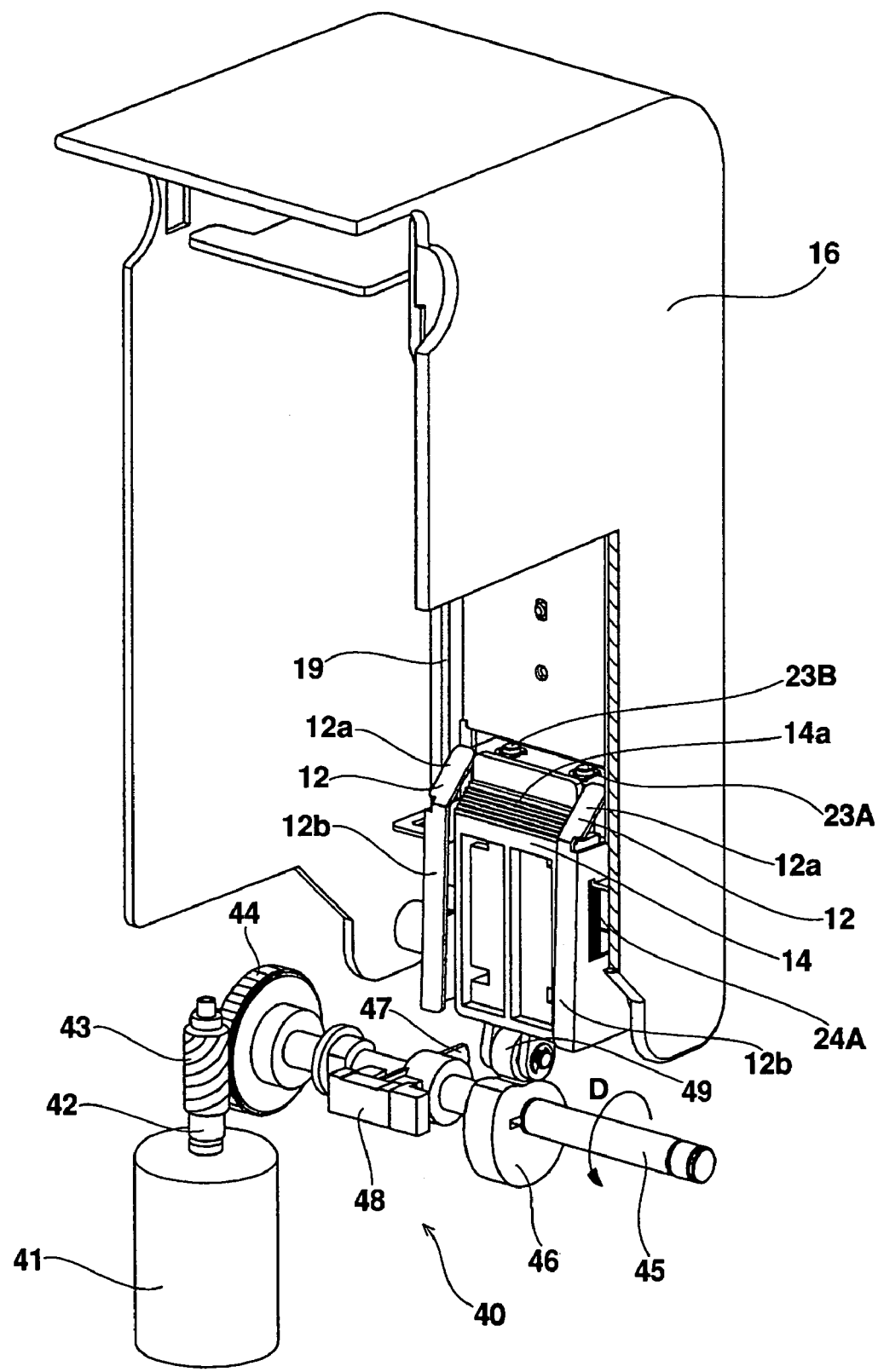
FIG. 4 is a perspective view showing a drive unit of a card supplying mechanism.
Figure 5:
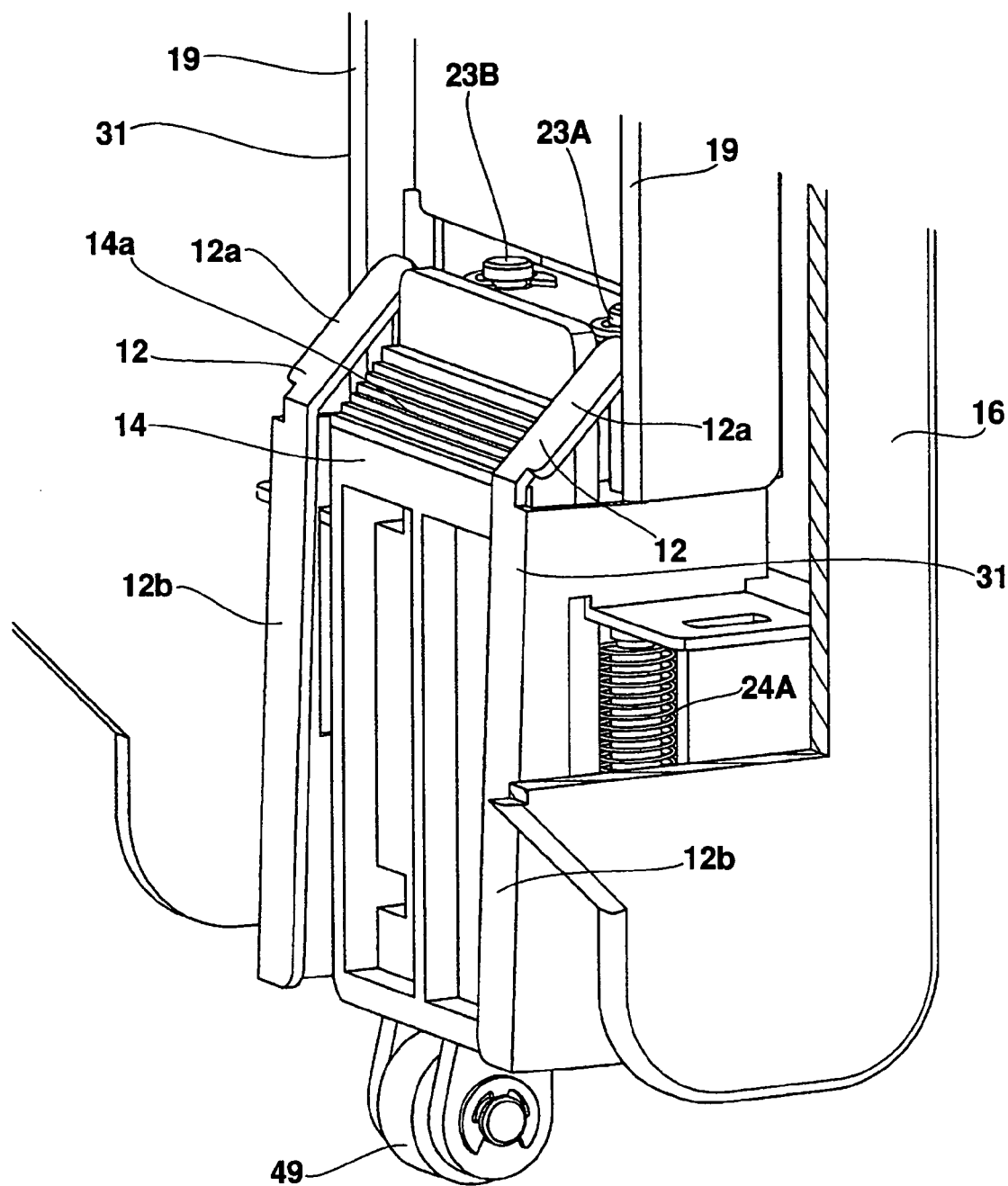
FIG. 5 is a partially enlarged view of the drive unit showing a card support member and a moving member of the card supplying mechanism.

As shown in FIG. 2, the cover 16 is mounted to the card stacker 11 so that the cover 16 can open by rotating around the rotating shaft Y so as to become positioned at a corner on top of the printer 1. As depicted in FIGS. 4 and 5, the cover 16 has card aligning guides 19 that configure a part of the inner wall on the inside of the card stacker 11.

Figure 3:
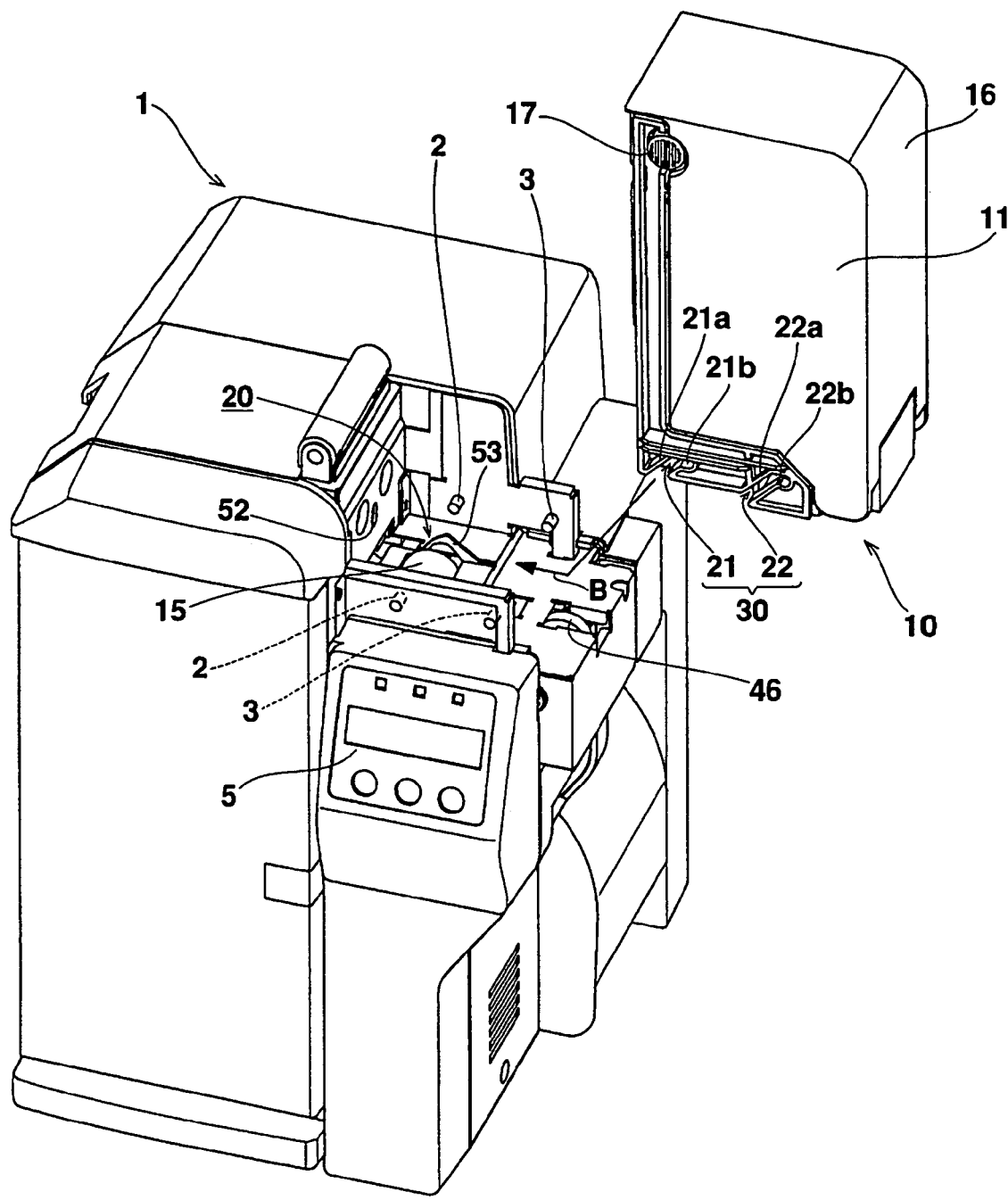
FIG. 3 is an external perspective view showing a card stacker mounted to the printing apparatus.

As can be seen in FIG. 3, the card stacker 11 is configured as a cassette structure that can be mounted to the printer 1. The card stacker 11 has a mounting unit 30 on the bottom (i.e., lower side surface) for mounting to the printer 1. Guide grooves 21 and 22 are formed in the mounting unit 30. Conversely, the printer 1 has projections 2 and 3 projecting into the opening 20. Thus, the projections 2 and 3 are guided (in sliding contact) along the guide grooves 21 and 22 by inserting the card stacker 11 in the direction of the arrow B in FIG. 3. The card stacker 11 is then mounted at a corner on top of the printer 1 and positioned at a predetermined position. (See the state shown in FIG. 2.) As is clear from the depiction of the projections 2 and 3 projecting on the printer 1 side shown in FIG. 3, there are guide grooves 21 and 22 formed in pairs on both sides (i.e., the front side and the backside) of the mounting unit 30.

The card stacker 11 is mounted on printer 1 by first inserting the stacker from above at an angle. Then, the card stacker 11 is moved so as to become horizontally oriented, thereby mounting it to the printer 1. The guide grooves 21 and 22 of the card stacker 11 have obliquely formed portions 21a and 22a, each at an angle of substantially 45°, and horizontally formed portions 21b and 22b that communicatively connect to each of the obliquely formed portions 21a and 22a. The projections 2 and 3 have a diameter that enables them to have sliding contact inside grooves 21 and 22.

The obliquely formed portion 21a of the guide groove 21 and the obliquely formed portion 22a of the guide groove 22 are formed at a downstream side in the direction of supplying a card C from the card stacker 11 (i.e., supplying toward the printer 1). That is, the obliquely formed portion 21a of the guide groove 21 and the obliquely formed portion 22a of the guide groove 22 are formed at a front side in the direction of mounting the card stacker 11 to the printer 1. The horizontally formed portion 21b of the guide groove 21 and the horizontally formed portion 22b of the guide groove 22 are formed at an upstream side in the direction of supplying a card C from the card stacker 11 (i.e., supplying toward the printer 1). That is, the horizontally formed portion 21b of the guide groove 21 and the horizontally formed portion 22b of the guide groove 22 are formed at a backside in the direction of mounting the card stacker 11 to the printer 1.

Each side (i.e., the front and back sides) of the projections 2 of the printer 1 side on which the guide grooves 21 slide project at a predetermined height position on a line extending in the roller width direction that traverses the top of the kick roller (see FIG. 3). This configuration enables both sides (i.e., the front and back sides) of the horizontally shaped portions 21b of the guide grooves 21 formed at a position from the guide grooves 22 near the opening slot 35 of the card stacker 11 to match a predetermined height position on a line extending in the roller width direction that traverses the top of the kick roller 15 when the card stacker 11 is completely mounted to the printer 1.

As shown in FIG. 4, the drive unit 40 has a motor 41 as an elevator drive source of the moving member 14; a worm gear 43 mated to a rotating shaft 42 of the motor 41; a helical gear 44 that engages the worm gear 43; a shaft 45 that is the center of rotation of the helical gear 44; and an eccentric cam 46 fastened to the shaft 45. Drive from the motor 41 is thus transmitted via the aforementioned transmission mechanism, thereby rotating the eccentric cam 46 in the direction of the arrow D in FIG. 4. A follower roller 49 fastened to the bottom end of the moving member 14 touches the outer surface of the eccentric cam 46. So, when drive from the motor 41 rotates the eccentric cam 46, the follower roller 49 rotates while in contact with the outer surface of the eccentric cam 46, thereby enabling the moving member 14 to rise and to lower according to the length of the diameter of the eccentric cam 46.

A semi-circular plate 47 that rotates along with the rotation of the shaft 45 is fastened to the shaft 45. This semi-circular plate 47 acts as a douser for a transmissive sensor 48 that is adjacently arranged. The semi-circular plate 47 and transmissive sensor 48 serve to determine a position (i.e., a risen position or a lowered position) of the moving member 14 that rises and lowers according to the rotation of the eccentric cam 46.

The support member 12 shown in FIGS. 4 and 5 is made of metal. To promote the cards C to move downward under their own weight, the support member has card support surfaces that are both oblique, and straight-line shaped. A substantially vertical guide portion (i.e., a straight-line shaped card support surface) 12b is formed as a single body with the obliquely shaped card support surface 12a. That is, the straight-line shaped card support surface 12b continues from the obliquely shaped card support surface 12a. The guide portion 12b is angled slightly from top to bottom (see FIG. 8). The guide portion 12b serves to guide an end (i.e., the trailing edge of the cards C in the direction of supply toward the printer 1) of the cards C stacked in the card stacker 11.

The moving member 14 is arranged on the inside of the support member 12 and has a card touching surface 14a made of plastic for touching the cards C when raised by the drive from the motor 41. The card touching surface 14a is oblique and step-shaped to promote the lifting of the cards C. The cards C touch the card touching surface 14a and are securely lifted while they are shifted in position with respect to each other. Two guide shafts 23A and 23B installed upright in the up and down directions are inserted into a portion of the moving member 14 so that the moving member 14 will rise along the two guide shafts 23A and 23B. Springs 24A and 24B (only spring 24A is shown in FIG. 5) are hooked to the two guide shafts 23A and 23B. Springs 24A and 24B constantly urge the moving member 14 toward the lower eccentric cam 46.

The card aligning guides 19, and the oblique card support surface 12a and guide portion 12b of the support member 12, are connected in the vertical direction so as to configure an inner wall 31 (see FIG. 8) of the trailing edge side in the direction of card supplying of the card stacker 11.

Figure 7:
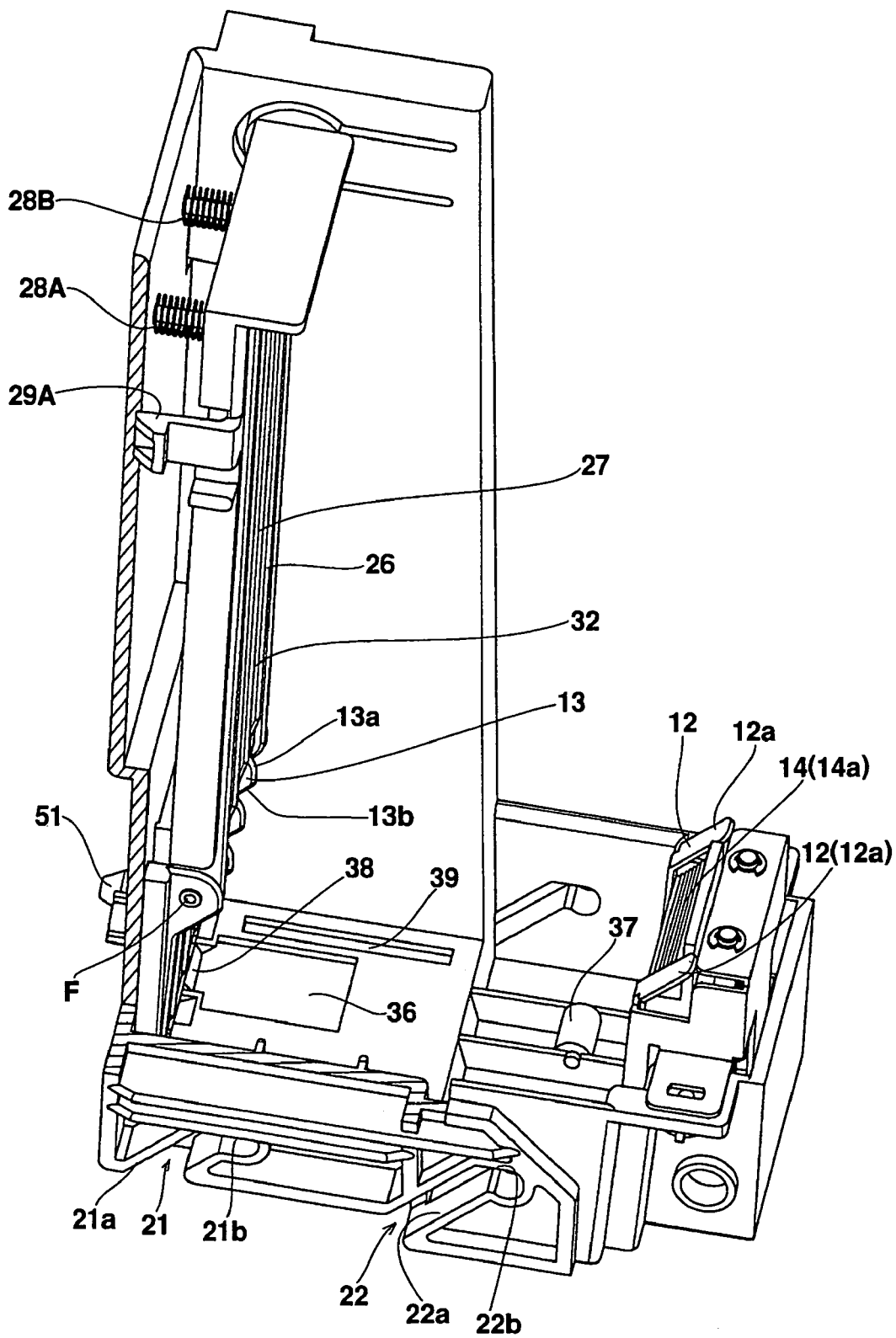
FIG. 7 is a perspective view showing a movable wall portion of a part of the inner wall of the card stacker.

As is shown in FIGS. 6 and 7, an inner wall 32 is arranged at a leading edge of the cards C in the direction of supplying of the card stacker 11. This inner wall 32 is formed by connecting a moving wall portion 27 having ribs 26, and a wall having projecting aligning members 13 and ribs 25 disposed in the vertical direction. The inner wall 32 is formed on a side opposing the inner wall 31 of the trailing edge side in the direction of card supply from the card stacker 11.

Specifically, the projecting members 13 are disposed in plurality extending across the width of the inner wall 32 for aligning the leading edge side of the direction of card supply toward the printer 1. The projecting members 13 are disposed at the leading edge side in the direction of supply from the card stacker 11 at positions that oppose the oblique card support surfaces 12a of the support member 12 at substantially the same height as the card support surfaces 12a. All of the aligning members 13 have substantially the same shape. The aligning members 13 have projecting portions 13a on the upper side that are formed into substantially arc shapes.

The portions 13b on the lower side are formed into substantially straight lines that are angled toward the leading edge side in the direction of card supply. The lower side portions 13b are formed into a single body and connected to the ribs 25 to configure a portion of the wall surface. Note that the angle of inclination of the lower side portions 13b of the aligning member 13 has substantially the same angle as the card support surfaces 12a of the support member 12 that are opposingly arranged at substantially the same height positions. (See FIG. 8.) The ribs 25 also have angles that are substantially the same angle to correspond to the slight angle of inclination of the guide portions 12b of the support member 12 that is opposingly arranged thereto.

The moving wall portion 27, equipped with the same number of ribs 26 as the number of aligning members 13, is disposed above the aligning members 13 so as to configure a portion of the inner wall 32 of the card stacker 11. The moving wall portion 27 is configured so as to rotate in the outside direction around the supporting point F. The effect of two springs 28A and 28B (see FIG. 7) located near the top of the position where the moving wall portion 27 is installed upright, is to constantly urge the moving wall portion 27 toward the inside of the card stacker 11. That is, the moving wall portion 27 is constantly urged by the two springs 28A and 28B toward the support members 12 and the moving member 14 side.

A stopper, 29A and 29B, disposed on each side of the moving wall portion 27, serves to lock the urging force of the springs 28A and 28B. (Only stopper 29A on the machine front side is shown in FIG. 7.) Stoppers 29A and 29B engage a concave surface on a portion of another wall surface of the card stacker 11 (not shown) so as to position the moving wall portion 27 in a substantially vertical state under normal conditions.

The inner wall portion 31 of the trailing edge in the direction of card supply from the card stacker 11, and the inner wall portion 32 of the leading edge in the direction of supply, are formed so that the leading and trailing edges of cards are offset in the direction of supplying, using the card support surface 12a of the support member 12 and the aligning member 13 as boundaries, in the cards C stacking direction (i.e., the vertical direction). (See FIGS. 8 to 10.)

As shown in FIG. 6, two long holes 33 aligned in a vertical orientation are provided on the left and right sides on a portion of a wall surface having the aligning members 13. (Only one long hole 33 is shown in FIG. 6.) The same wall surface is fastened by screws 34. Specifically, the wall surface that is held by screws is configured to be movable in the vertical direction along holes 33. Because the wall surface that has the aligning members 13 and the ribs 25 is adjacent to the moving wall portion 27, the inner wall portion 32 can move upward and downward the distance provided by the long hole 33.

As can be seen in FIG. 8, the opening slot 35 is positioned at the bottom edge of the inner wall 32. The long holes 33 and the screws 34 function to adjust the gap between the bottom edge of the inner wall portion 32 and the roller 38 (described below) according to the thickness of the cards C. Therefore, the inner wall portion 32 on the leading edge side in the direction of supplying of the card stacker 11 is provided a gap adjustment mechanism. The gap adjustment mechanism facilitates adjustment of the height position (i.e., the gap of the opening slot 35) of the bottom edge of the inner wall portion 32 according to the different thicknesses of cards.

As shown in FIG. 7, a rectangular opening 36 is located in the bottom surface inside the inner wall portion 32 of the card stacker 11. Rectangular opening 36 enables the top portion of the kick roller 15 to enter when the card stacker 11 is mounted to the printer 1. Specifically, the kick roller 15 on the printer 1 side is located so that a portion thereof (i.e., a top portion) can be exposed through the opening 36. (See FIGS. 1 and 3.) Also, plastic rollers 37 and 38 for assisting the kicking out of cards by the kick roller 15 are provided, respectively, at an upstream side of the direction of card supply of the bottommost card nipping the opening 36, and at a downstream side.

The roller 38 is directly below the opening slot 35. Roller 38 is positioned at a downstream side of the kick roller in the direction of card supply. A card C kicked out by the kick roller 15 travels along in contact with the outer circumference of the roller 37 (in the same way as for the roller 38) and passes through the opening slot 35. Furthermore, a long, narrow opening 39 is formed adjacent to the kick roller 15 in the bottom surface of the card stacker 11. Opening 39 allows entry of a lever sensor 53 for detecting the presence of a card C inside the card stacker 11.

A substantially cone-shaped protrusion 51 for positioning projects from a portion of an outer wall of the card stacker 11 (on the bottom side) that opposes the printer 1. The leading end of the protrusion 51 advances to the inside of the printer 1 when the card stacker 11 is mounted to the printer 1. (See FIG. 7.) The printer 1 has a positioning hole 52 (see FIG. 3) formed therein for enabling the protrusion 51 to advance into the printer 1.

The card supplying mechanism 10 is arranged at a position near the kick roller 15 on the first transport path p1, inside the printer 1. Mechanism 10 has a transmissive sensor 61 for detecting the cards C supplied from the card stacker 11. (See FIG. 2.) The transmissive sensor 61 includes a light emitting element 61a arranged at a bottom side of the first transport path p1, and a light receiving element 61b arranged at a top side of the first transport path p1. Thus, these two elements (61a and 61b) nip the first transport path p1.

In the following description, operation of the printer 1 of the first embodiment of the invention will be described, with emphasis on the CPU of the CPU block of the control unit 92. When an operator presses the power switch on the operation panel 5, the CPU expands programs and program data stored in ROM to RAM, and performs an initializing process on the settings to reset the counter (described below) to 0. Then, the CPU performs: (A) an initializing process on the printer 1 and the card supplying mechanism 10; and (B) prints data. The aforementioned processes occur in the order described. The description below assumes that image information to be printed to a card C has already been received from an external computer via an external I/O interface, and stored in RAM.

Initializing Process

First, the CPU performs an initializing process of the printer 1. This initializing process drives motor Z via an actuator control unit and positions the head advancing and retreating drive unit at its initial position.

After initializing the printer 1, the CPU initializes the card supplying mechanism 10. First, when initializing the card supplying mechanism 10, the CPU determines whether the lever sensor 53 has detected the cards C via the sensor control unit. If the determination is negative, the CPU outputs a signal to the operation panel 5 that there are no cards in the card stacker 11, and idles until an operator presses a predetermined button on the operation panel 5. When that predetermined button is pressed on the operation panel 5, the CPU again determines whether the lever sensor 53 has detected cards C. If the determination is again negative, the CPU will notify the operator again via the operation panel 5 that there are no cards, and repeat its idling until the operator presses the predetermined button on the operation panel 5.

The operator is notified that there are no cards in the card stacker 11 by the display on the operation panel 5. The operator opens the cover 16 to re-supply the card stacker 11 by stacking cards C inside. Then, by closing the cover 16, the card aligning guide 19 pushes on the trailing edge of the bundle of cards thereby aligning the bundle of cards C.

When the operator presses a predetermined button on the operation panel 5, the CPU again determines whether there are cards C using the results from the lever sensor 53. If the result is negative again, the same process as was described is performed. Specifically, the CPU informs the operator of the state on the operation panel 5. Detection of the cards C by the lever sensor 53 is also executed in the continuous printing processes (described below) each time a card C is supplied. If the determination is affirmative (or, when the lever sensor 53 detects the cards C via the sensor control unit at the beginning of the initialization), the system executes a rising operation of the moving member 14.

Figure 11C:
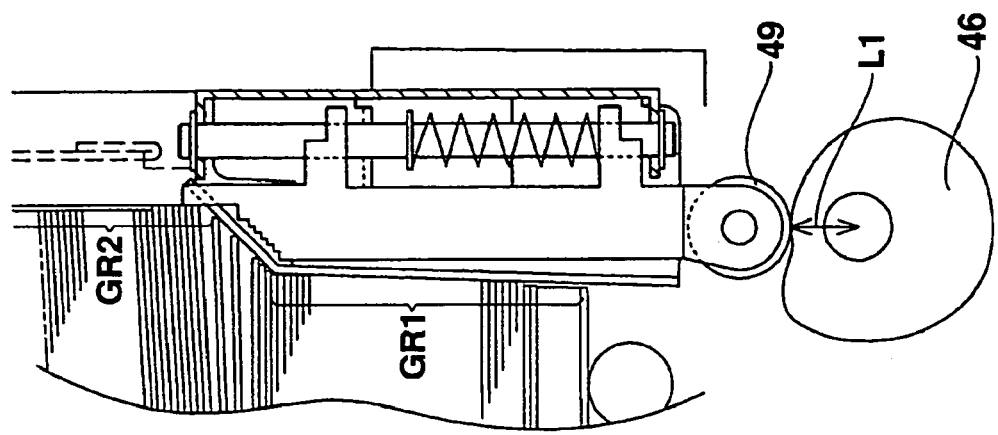
FIGS. 11A, 11B and 11C are partially enlarged views that illustrate operation of the moving member.
Figure 11B:
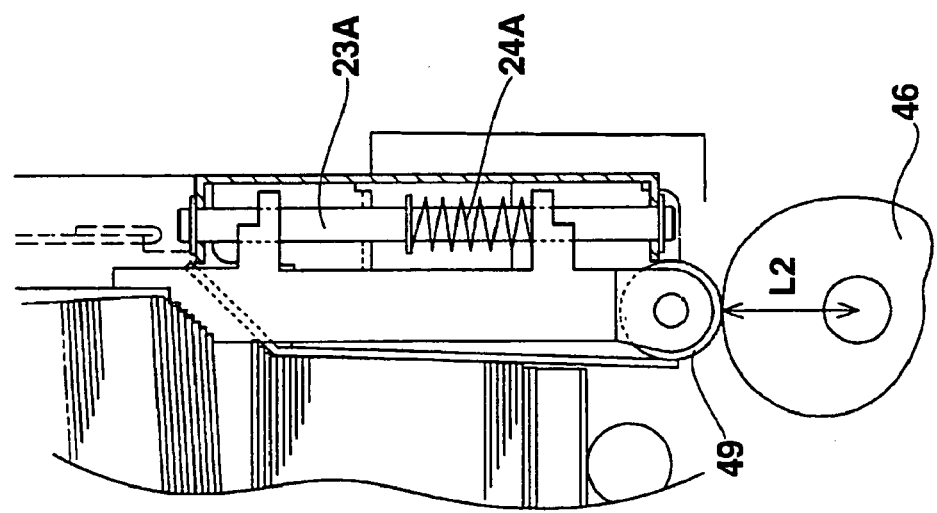
Figure 11A:
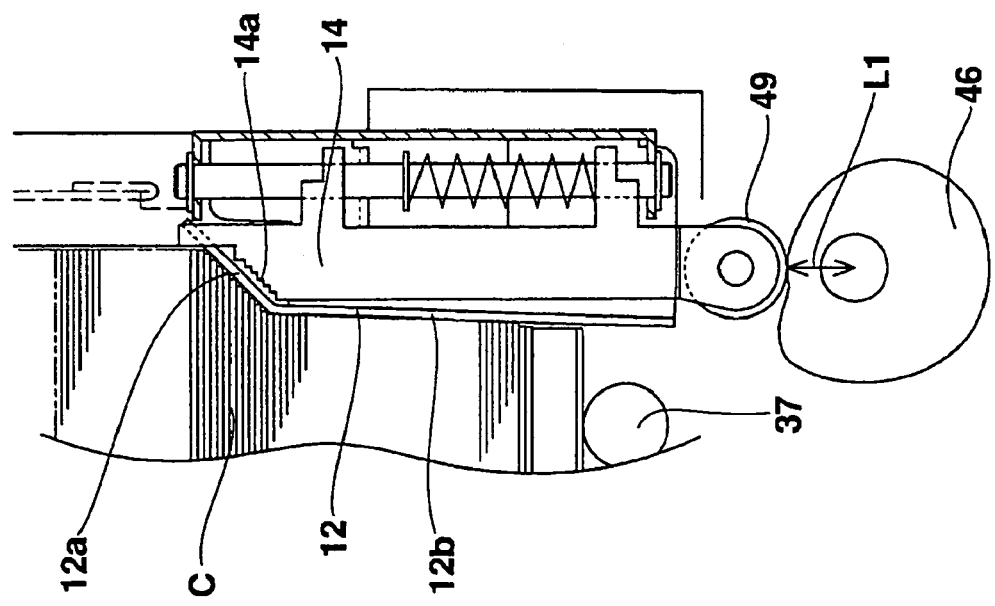
Figure 12:
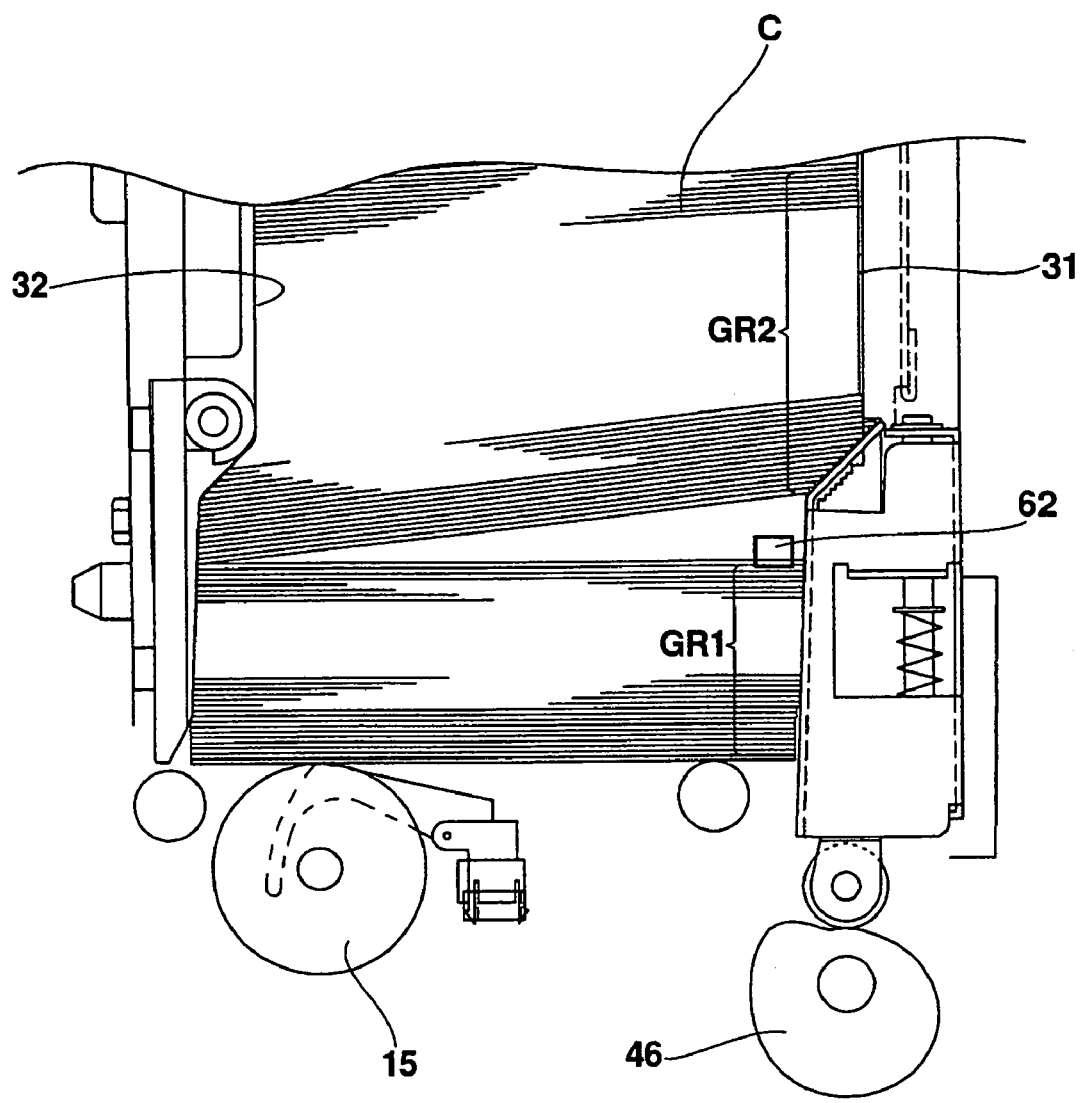
FIG. 12 is a front view of a card supplying mechanism of another embodiment of the present invention.

When there are a number of blank cards C stored in the card stacker 11, they are closely positioned on their flat surfaces in a horizontal orientation (i.e., a vertical stack of horizontally-oriented cards positioned on their flat surfaces). As shown in FIGS. 8 and 11A, the follower roller 49 equipped on the bottom end of the moving member 14 is in contact with a cam surface (i.e., the circumference surface of the cam) that corresponds to a minimum diameter of L1 of the eccentric cam 46. The card contact surface 14a of the moving member 14 is positioned lower than the card support surface 12a of the support member 12.

Figure 9:
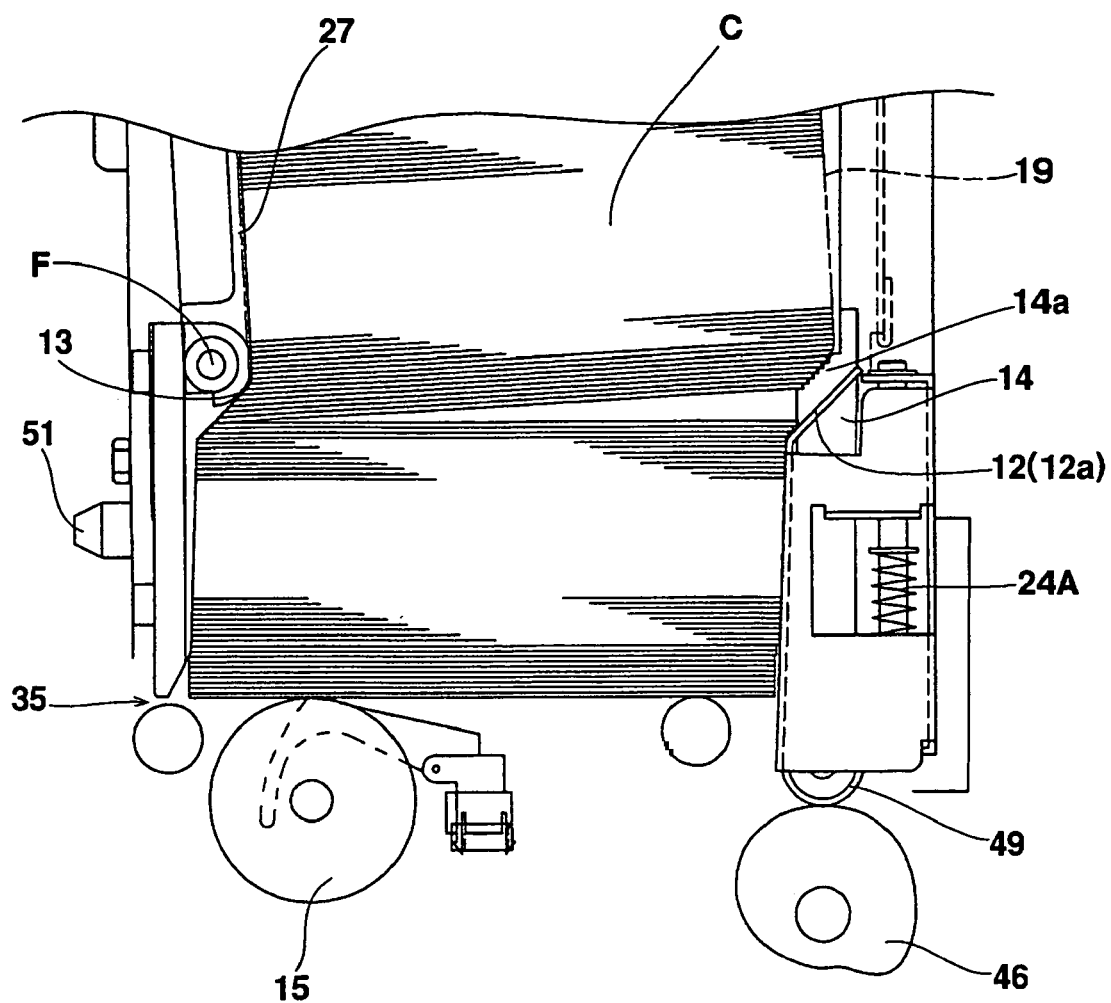
FIG. 9 is a front view showing the moving member in a raised state.
Figure 10:
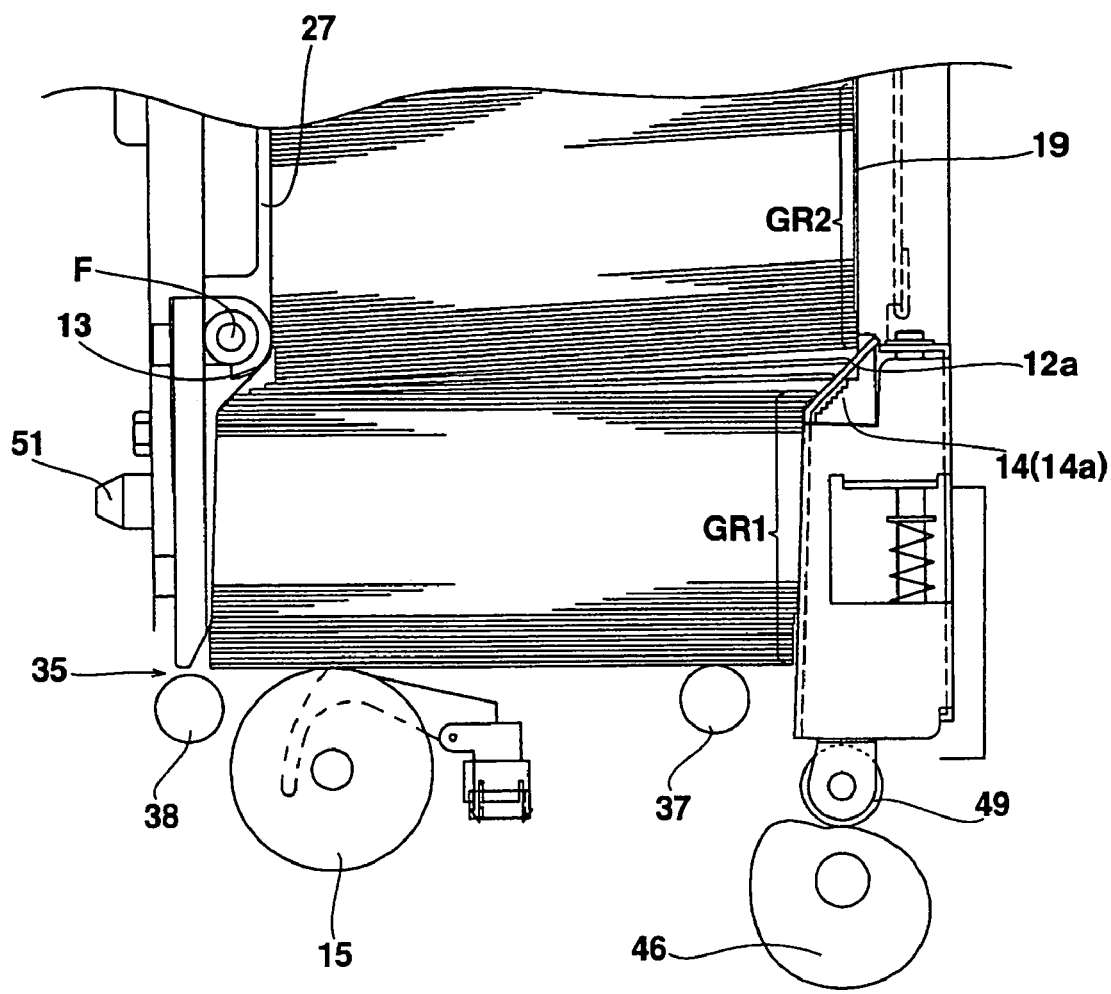
FIG. 10 is a front view showing a final state of an initial process of the card supplying mechanism with the moving member lowered.

During the rising action of the moving member 14, the motor 41 drives via the actuator control unit rotating the eccentric cam 46 in the direction of the arrow D in FIG. 4, thereby pushing the follower roller 49 while resisting the urging forces of the springs 24A and 24B. This causes the moving member 14 to rise, as shown in FIGS. 9 and 11B. The card touching surface 14a touches one end of the cards C that are above the card support surface 12a of the support surface 12. The card touching surface 14a thus lifts the cards C that are touching the support surface 12a along with the other cards C stacked thereabove a predetermined height.

In this state, the follower roller 49 has a positional relationship with the cam surface that corresponds to the maximum diameter L2 of the eccentric cam 46 (see FIG. 11B). Because the card touching surface 14a is formed to be oblique and step-shaped, the cards C that are in contact with the card touching surface 14a are lifted while in a mutually shifted state.

As shown in FIG. 9, when the moving member 14 (specifically, the card touching surface 14a) lifts the cards C, one side of the cards positioned at the bottom of those lifted cards (i.e., the leading edge side in the direction of supplying cards) is supported on the uppermost card C of the cards that maintain a stacked state without being lifted (approximately 60 cards). One end of the cards that are touching the card support surface 14a are kept in an aligned state by the projecting aligning member 13. The moving wall portion 27 resists the urging forces of the springs 28A and 28B to move rotatingly a predetermined angle toward the outer side of the card stacker 11 (if viewing FIGS. 2 and 3, the printer 1 side) around the support point F. This occurs along with the lifting action of the cards by the moving member 14. This causes the lifted cards to be positioned in an oblique state.

Next, the CPU determines whether the moving member 14 is at a raised position based on detection information received from a detector unit comprising the semi-circular plate 47 and the transmissive sensor 48. Specifically, when the light emitted from the light emitting element of the transmissive sensor 48 shifts from an interrupted state (i.e., interrupted by the semi-circular plate 47) to a state in which it is allowed to pass through a notch formed in the semi-circular plate 47 to be received by the light receiving element of the transmissive sensor 48 (see the state shown in FIG. 4), the CPU determines that the moving member 14 is positioned at its lowest position. Conversely, when the sensor 48 light shifts from a transmissive state to an interrupted state, the CPU determines that the moving member 14 is positioned at its raised, or highest, position.

When it is determined that the moving member 14 is at a raised position, the motor 41 drives to rotate the eccentric cam 46 further in the direction of arrow D shown in FIG. 4. This action causes the follower roller to return to the position shown in FIG. 11A, i.e., positioned on the cam surface that corresponds to the minimum diameter L1 of the eccentric cam 46. The lowered position is also shown in FIG. 11C. The moving member 14 thus lowers along with this rotation of the eccentric cam 46. Along with that action, the card touching surface 14a is positioned lower than the card support surface 12a of the support member 12, and a portion of the cards C that had been lifted are again supported on the card support surface 12a of the support member 12 in an unorganized state. (See the state shown in FIG. 10 and FIG. 11C.)

As depicted in FIG. 11C, the cards stacked in the card stacker 11 are sorted into two stacked groups above and below several cards that are supported in an unorganized state by the card support surface 12a described above. GR1 is a first stacked group positioned on the lower side; GR2 is a second stacked group positioned on the upper side. The first stacked group GR1 and the second stacked group GR2 are separated in a mutually offset state because the inner walls 31 and 32 of the card stacker 11 are configured in an offset state. Again, the CPU determines whether the moving member 14 is at a raised position based on detection information received from the detector unit comprising the semi-circular plate 47 and the transmissive sensor 48.

When it is determined that the moving member 14 is at its lowest position, the drive from the motor 41 is stopped, and the initializing process of the card supplying mechanism 19 is ended. This causes the cards C to be lifted once by the card touching surface 14a because of the rising action of the moving member 14. Then, positioning one end of the cards on top of the oblique card support surface 12a of the support member 12 by lowering along with the lowering action of the moving member 14, places the cards C to be freed from a closely positioned state so as to be mutually separated. That is, the vertical rising action of the moving member 14 promotes the mutual loosening of the cards C.

Printing

Next, the CPU prints to the cards C using the printer 1. Image information to be printed to the cards C has already been received, as described above. If the received image information is for color images, that information is converted into thermal energy for each of ink layers Y, M and C. If the received image information is for black and white images, it is converted into thermal energy for black and white images during the initialization of the card supplying mechanism 10. Preprocessing for printing is executed in this way prior to the printing process. Printing idles until the operator presses a printing start button on the operation panel 5 (or until the printer receives a print instruction from an external computer).

When the operator presses a print button on the operation panel 5 (or when there is a print instruction from an external personal computer), the CPU turns on a solenoid clutch to transmit rotational drive force of the motor A to the kick roller 15, and turns on another, separate solenoid clutch to transmit the rotational drive force of the motor B to the pressing roller of the cleaner 71 and the pinch roller of the card turnover unit 72. This causes the kick roller 15 to rotate, thereby kicking out only the lowermost card C that is in contact with the kick roller 15, from the card stacker 11. The card C travels along the first transport path p1 and is transported to the card turnover unit 72 via the cleaner 71.

At this time, transmissive sensor 61 detects the card C kicked out from the card stacker 11. The CPU counts the number of detected cards. Specifically, the CPU functions as a counter for counting the number of cards C kicked out from the card stacker 11. The CPU determines whether the counter is at a predetermined number of cards (e.g., 5). If affirmative, the CPU executes a rise operation of the moving member 14, described above, at the card supplying mechanism 10 side. In other words, the CPU executes the rise operation of the moving member 14 for each time the predetermined number of the cards C have been kicked out to promote the mutual offset of the cards C.

If the determination is negative, the CPU drives the motor A a predetermined number of pulses after the sensor S1 detects the leading edge of a card C, and then stops the rotation of the kick roller 15 with the solenoid clutch turned off. Also, when sensor S1 detects the trailing edge of the card C, the CPU turns off the other solenoid clutch so as to stop the rotation of the pressing roller of the cleaner 71.

The card C travels along the first transport path p1 until the center of the card C reaches the intersection point of the first transport path p1 and the second transport path p2. At this point, the CPU turns off yet another, separate solenoid clutch to transmit rotational drive force from the motor A. This rotates the card turnover unit 72 90° around the intersection point X while the card C is nipped by the pinch rollers of the card turnover unit 72.

A sensor (not shown) monitors whether the card C matches the orientation of the second transport path p2 (i.e., whether the card C is parallel to the second transport path p2) by rotation of the turning frame 90°. When the turning frame is rotated 90°, the CPU drives the motor M that rotates the pair of transport rollers 75 and 76 and the platen roller 77 that are disposed on the second transport path p2. The CPU also turns on another solenoid clutch to transmit the rotational drive force of the motor B to the pinch rollers of the card turnover unit 72, thereby supplying the card C1 toward the card printing unit 90. The supplying of the card C to the card printing unit 90 is completed at the point where the card C recording starting point (i.e., the leading edge of the card C) reaches the printing position Sr. It is possible, for example, to ascertain the position of the leading edge of the card C by knowing the count of the number of pulses of the motor M after the trailing edge of the card C transported on the second transport path p2 is detected by a sensor S2.

The motor Y then drives to transport the ink ribbon R in the direction for the ribbon take-up reel 82 to take up the ribbon R. When a sensor S3 detects a mark established at a predetermined position on the ink ribbon R for position detection, the ink ribbon R is supplied in a return direction a predetermined distance (a predetermined number of pulses to transport the ink ribbon R using the motor Y) to set the leading edge position of the ink layer Y at a position that opposes the thermal head 80 position.

Next, the motor Z drives to rotate the cam of the head advancing and retreating drive unit. This action moves the thermal head 80 that is in a print idling state toward the card C to shift to a print execution state. With this process, the thermal head 80 presses the ink layer Y of the ink ribbon R against the card C surface. In this state, as the card C is moving toward the card turnover unit 72, the heating elements of the thermal head 80 are selectively heated according to the amount of converted thermal energy of Y via the thermal head control unit, thereby causing the ink component of the ink layer Y of the ink ribbon R to thermally sublimate and adhere to the surface of the card C. When printing is completed using the ink layer Y, the thermal head shifts from the print execution state to the print idling state by driving the motor Z. Then, a next ink layer can be prepared for printing.

When printing is completed using the ink layer Y, the motor M drives in reverse until the printing starting point of the card C reaches the printing position Sr. The motor Y drives to transport the ink ribbon R so that the leading edge position of an ink layer M is positioned opposite the thermal head 80. Next, the motor Z drives to shift the thermal head 80 to the print execution state and to press the ink layer M against the card C surface using the thermal head 80. In this state, as the card C is moving toward the card turnover unit 72, the heating elements of the thermal head 80 are selectively heated according to the amount of converted thermal energy of M, thereby causing the ink component of the ink layer M of the ink ribbon R to thermally sublimate and adhere to the surface of the card C.

The ink component of the ink layer C of the ink ribbon R is printed on the surface of the card C in the same way. The aforementioned processes print color images to a card C surface according to the image information received. In another embodiment of the printing operation according to the present invention, it is possible to print in a single color using the black ink layer Bk instead of using the color components on the ink ribbon R.

When the printing processes to the card C are completed, the CPU drives the motor M in reverse thereby transporting the card C along the second transport path p2 to the card turnover unit 72. The sensor S2 detects a leading edge of the card C traveling along the second transport path p2. When the leading edge is detected, a different solenoid clutch is turned on to transmit the rotational driving force of the motor B to the pinch rollers of the card turnover unit 72. The card turnover unit 72 is vertically oriented at this time, allowing the card C to travel into the center of the card turnover unit 72. There the card C is held between the pinch rollers of the card turnover unit 72.

When the center of the card C reaches the intersecting point X, the card C is nipped by the pinch rollers, and another solenoid clutch is turned on, thereby transmitting rotational drive force (in the reverse direction) from the motor A to rotate the card turning unit 72 90° in a counterclockwise direction.

Next, the CPU turns on still a different solenoid clutch to transmit the rotational drive force of the motor A to the pinch rollers of the card turnover unit 72 and to the pair of discharge rollers 78. The card C passes through the card discharge unit 79 located at the trailing end of the first transport path p1, to the outside of the casing 7. This completes a printing process for one card C. The pinch rollers of the card turnover unit 72 and the pair of discharge rollers 79 stop at the point where the motor B has output a predetermined number of pulses. Continuous printing to card surfaces is repeated using the same steps as those described above.

Operation of the printer 1 with respect to the card stacker 11 is further described below. With the printer 1 of this embodiment of the present invention, cards stored in a vertically-stacked state in the card stacker 11 are lifted by the card touching surface 14a when the initialization process raises the moving member 14. After the cards are raised, one end of each card raised by the card touching surface is positioned over the oblique card support surface 12a, thereby separating and freeing cards from a closely set state. The number of cards C that belong to the first stacked group GR1 gradually decreases as printing progresses. Therefore, cards positioned above the first stacked group GR1 (the cards supported on the card support surface 12a in an offset state) drop sequentially to become part of the first stacked group GR1. Because the rising action of the moving member 14 is executed each time the counter reaches a predetermined number in the printing process, cards C are released from a closely positioned state, and are mutually separated.

If the cards C used in the printer 1 are made of plastic, such as PVC, they can easily adhere to one another. Particularly, if the printer 1 is used in an environment having high temperatures or high humidity, this phenomenon can become pronounced, thereby causing problems in the supply of cards because the cards cannot be easily separated. Therefore, the card supplying mechanism 10 of the printer 1 according to this embodiment of the present invention applies a rising action of the moving member 14, described above, at a predetermined timing. This rising action not only promotes the fall of cards C, but also improves the mutual separation of the cards C. The aforementioned action also reduces the load applied to the lowermost card C being supplied, which improves the supply operation of the card C to the printer 1.

It may be possible that operations can stop, or transport problems can occur, because of an interruption of electric power while supplying a card C from the card stacker 11 to the printer 1. In the event that a card C is jammed while straddling the card stacker 11 and the printer 1, the jammed card must be removed by dismounting the cassette-structured card stacker 11. A card C straddling the card stacker 11 and the printer 1 will make it impossible to lift the card stacker directly upward. Forcefully lifting the stacker will damage the card C to the extent that it cannot be reused. In some cases, doing so can damage both the card stacker 11 and the printer 1. On the other hand, it is conceivable to pull the card stacker 11 out horizontally, but the kick roller 15 disposed below the card stacker 11 on the printer 1 may become damaged. Therefore, pulling the card stacker 11 in a horizontal direction away from the printer is not possible.

With the printer 1 according to this embodiment of the present invention, the mounting unit 30 of the card stacker 11 has guide grooves 21 and 22. These guide grooves 21 and 22 have oblique portions 21a and 22a that are at a substantially 45° angle, and horizontal portions 21b and 22b that communicate with 21a and 22a. As shown in FIG. 3, the card stacker 11 is mounted to the printer 1 by inserting it at an angle from above the printer 1, then lowering it to become horizontally oriented. Thus, it is possible to dismount the card stacker 11 from the printer 1 by moving the card stacker 11 in a direction that is reverse of the arrow B shown in FIG. 3. Therefore, a jammed card C will not be damaged when removed using that method, making it possible to reuse the card. This method also avoids damaging other members on the printer, such as the kick roller 15. By virtue of the configuration of the present invention, neither the printer 1 nor the card stacker 11 will be damaged if it is necessary to remove a jammed card.

With the printer 1 of this embodiment of the present invention, a roller 38 is positioned directly below the opening slot 35. Because this is positioned at the leading end in the direction of supplying cards on the bottom of the card stacker 11, the roller 38 rotates (slides) over the circumference surface of the kick roller 15 disposed on the printer 1 when the cassette type card stacker 11 is mounted to the printer (i.e., when the card stacker 11 is inserted at an angle from above).

According to this embodiment of the present invention, the moving member 14 rises when the number of cards C kicked to the first transport path p1 reaches a predetermined count as detected by the transmissive sensor 61. The timing of the rise of the moving member 14, however, is not necessarily limited to the predetermined card count. Instead, in another embodiment of the invention, the transmissive sensor 62 can be located at a predetermined height for detecting cards C stored in the first stacked group GR1 in the card stacker 11, and to raise the moving member 14 by driving the motor 41 when the sensor 62 detects that there are no cards present at the predetermined height position of the first stacked group GR1 because of the decrease in the number of cards C resulting from supplying from the card stacker 11.

In still another embodiment of the invention, it is possible to measure time in the control unit 92. Specifically, by using the control unit 92 as a timer, or by equipping the control unit 92 with a timer IC, it is possible to raise the moving unit 14 by driving the motor 41 at each predetermined time (for example, every three minutes and thirty seconds). In such an embodiment, it is preferable to configure the system to make it possible to easily set the timing using the operation panel 5 of the printer 1 (or an external computer) for any printing condition. For example, printing in color by layering the ink layers of Y, M and C for continuous printing of cards C takes more time than printing in one color (for example, Bk) to one card. Printing times can also vary because a card C may require, in addition to the print functions of the printer 1, recording by providing an encoder function that magnetically or electrically records data to a card C.

The present invention has been described herein as including a motor 41 on the printer 41 as a drive source for the kick roller 15 for supplying cards and for the rising action of moving member 14. In another embodiment of the invention, however, it is possible to dispose the motor on the card supplying mechanism 10 side. In this embodiment, the card supplying mechanism 10 is configured as a stand-alone, peripheral card supplying apparatus. In this stand-alone embodiment, a control unit comprising a micro-computer is provided on the card supplying apparatus. In one possible embodiment of the invention, the stand-alone control unit can function as a slave computer of the control unit 92.

The present invention has also been described herein as having the moving member 14 disposed in the support member 12. In still another embodiment of this feature of the present invention, however, it is possible to configure the support member 12 so as to freely rise to lift the support cards and one end (i.e., the trailing edge of the supplying direction of cards) of cards C stacked thereabove. It is also possible to configure the moving member 14 and support member 12 to be one or separate bodies.

The present invention has also been described herein as comprising a direct current drive motor 41, an eccentric cam 46, and a follower roll 49 as a means for raising and lowering the moving member 14. But, instead of motor 41, cam 46, and follower roll 49, a linear motor can be used. A linear motor can be configured to raise and lower the moving member 14 by controlling the pulses that drive the linear motor.

The present invention has also been described as providing a method of printing to one side of the card C. In still another embodiment of the present invention, however, after printing to one side of the card C, it is possible to print to another side of the card C by transporting the card C to the card turnover unit 72 and rotating the unit 72 180°. The card C printed to both sides can then be discharged from the card discharge unit 79.

Finally, the present invention has been described as including a transmissive type sensor, such as sensor 61, comprising a light emitting element and light receiving element. It is contemplated, however, that a reflective type sensor could instead be used, and that such a modification does not constitute a departure from the spirit and scope of the present invention.

The disclosure of Japan Patent Application No. 2004-281959 filed on Sep. 28, 2004, is incorporated herein.

What is claimed is:

1. A card supplying mechanism comprising:
   a card storage unit for vertically stacking a plurality of cards;
   a support, disposed on a first side of said card storage unit, for supporting a first side of said stacked cards at a predetermined height in said card storage unit;
   an aligner, disposed on a second side of said card storage unit, opposite said support, for aligning a second side of said stacked cards;
   a moving member for lifting the first side of said stacked cards supported by said support, said moving member having an oblique and step-shaped card touching surface to surely lift the cards in a laterally shifted condition;
   a driver for driving said moving member in a vertical direction; and
   a kicker for sequentially discharging from said card storage unit a bottommost card, one at a time.

2. A card supplying mechanism according to claim 1, wherein said support has a card support surface oblique and straight-line-shaped.

3. A card supplying mechanism according to claim 1, wherein said card storage unit comprises a vertically-oriented inner wall portion for offsetting a first stacked group and a second stacked group comprising cards separated in a vertical direction by said support and said aligner.

4. A card supplying mechanism according to claim 3, further comprising a rotatable moving wall portion integral to said inner wall portion and disposed above said aligner; and
   an elastic member for urging said moving wall portion toward said first side of said card storage unit.

5. A card supplying mechanism according to claim 3, further comprising a first detector disposed near said kicker for detecting a card discharged by said kicker; and
   a counter for counting a number of cards detected by said first detector, wherein said driver raises and lowers said moving member according to a count of a predetermined number of cards counted by said counter.

6. A card supplying mechanism according to claim 5, further comprising a second detector for detecting a card stored in said first stacked group positioned below said second stacked group, wherein said driver raises and lowers said moving member when said second detector does not detect a card.

7. A card supplying mechanism according to claim 3, wherein said vertically-oriented inner wall portion is laterally shifted at the support for holding the first stacked group and the second stacked group laterally separated from each other.

8. A card supplying mechanism according to claim 1, further comprising a timer for measuring time, wherein said driver raises and lowers said moving member each time said timer measures a predetermined amount of time.

9. The card supplying mechanism according to claim 1, wherein said card storage unit comprises a cassette structure capable of being mounted on a main apparatus for receiving said discharged card.

10. A card supplying mechanism according to claim 1, wherein said moving member is structurally integral with said support.

11. A card supplying mechanism according to claim 1, wherein said moving member is a separate structure in communication with said support.

12. A card supplying mechanism according to claim 1, wherein said moving member is located below the support, and only when the driver is operated, the moving member projects above the support.

13. A card supplying mechanism according to claim 12, wherein said support has a space in a middle area thereof, said moving member being located in the space.

14. A card supplying method comprising the steps of:
    holding a plurality of cards obliquely horizontally in a stacked state;
    raising and lowering a first side of a plurality of cards stored in the stacked state while aligning a second side opposite to the first side;
    gradually shifting the cards laterally step by step in the raising and lowering step;
    separating, after said raising and lowering step, said plurality of stacked cards into a first group and a second group in a vertical direction, said first and second groups being shifted from each other laterally; and
    sequentially discharging from said first group a bottommost card, one at a time, of said plurality of stacked cards.

15. A card supplying method according to claim 14, further comprising a counting step for counting a number of cards discharged in said discharging step, said raising and lowering step being performed at each count of a predetermined number of cards counted in said counting step.

16. A card supplying method according to claim 14, wherein said raised cards are positioned in a mutually offset state by said raising and lowering step.

* * * * *